(12) United States Patent
Besson et al.

(10) Patent No.: US 6,246,742 B1
(45) Date of Patent: Jun. 12, 2001

(54) LOCAL CT IMAGE RECONSTRUCTION WITH LIMITED X-RAY EXPOSURE

(75) Inventors: Guy M. Besson, Wauwatosa; Tin-Su Pan, Brookfield, both of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/337,688

(22) Filed: Jun. 22, 1999

(51) Int. Cl.[7] .................................................. A61B 6/03
(52) U.S. Cl. .............................. 378/8; 378/15; 378/901
(58) Field of Search .......................... 378/4, 8, 15, 901

(56) References Cited

U.S. PATENT DOCUMENTS

| | | |
|---|---|---|
| 4,333,145 | 3/1982 | Heuscher et al. . |
| 4,878,169 | 10/1989 | Toner et al. . |
| 5,881,123 | 3/1999 | Tam . |
| 6,009,142 | * 12/1999 | Sauer et al. .............................. 378/15 |

OTHER PUBLICATIONS

"Reduction of Truncation Artifacts in Fan Beam Transmission by using Parallel Beam Emission Data," by Tin–Su Pan et al., IEEE Transactions on Nuclear Science, vol. 42, No. 4, Aug. 1995, pp. 1310–1320.

"Choice of Initial Conditions in the ML Reconstruction of Fan–Beam Transmission with Truncated Projection Data," by Tin–Su Pan et al., IEEE Transactions on Medical Imaging, vol. 16, No. 4, Aug. 1997, pp. 426–438.

* cited by examiner

Primary Examiner—David V. Bruce
(74) Attorney, Agent, or Firm—Armstrong Teasdale LLP; Christian G. Cabou (57) ABSTRACT

Methods and apparatus for reconstructing an image of an object utilizing an imaging system, in which a limited width beam of radiation is emitted towards the object, the limited width beam of radiation having a fan beam angle extent selected to encompass a perimeter of a region of interest (ROI) within the object and to encompass less than a perimeter of the object itself; a set of truncated projection data of the object, including projection data of the ROI, is obtained by detecting the radiation from the limited width beam of radiation passing through the object; low frequency components of the set of truncated projection data are estimated; and an image of the ROI within the object is reconstructed utilizing the set of truncated projection data and the estimated low frequency components. Information from a limited set of complete projection data can be used to estimate the low frequency components of the set of truncated projection data, but such information is not required.

38 Claims, 7 Drawing Sheets

LOCAL CT IMAGE RECONSTRUCTION WITH LIMITED X-RAY EXPOSURE

BACKGROUND OF THE INVENTION

This invention relates generally to methods and apparatus for reconstructing image data, and more particularly to methods and apparatus for image reconstruction in a computerized tomography (CT) imaging system providing reduced X-ray exposure as compared to conventional CT imaging systems.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

Exposure to x-rays in CT imaging systems may present a hazard to a patient. At least in the long term, it may also present a hazard to a physician performing a procedure in the vicinity of a CT imaging system. Current CT systems provide tomographic cross-sections of a patient with a field of view that is normally around 50 cm, and a gantry opening of 70 cm. For applications in imaging a small organ such as a heart, exposing a patient with X-ray photons across the whole cross-section of the patient where the region of interest is a small organ may not be justifiable.

Several techniques have been proposed to reduce the total exposure risk. For example, the x-ray source may be turned on only when the source is on its lower trajectory, where both primary and scatter are more likely to be attenuated by the patient table. Often, after initial localization and insertion of a biopsy needle, a physician is interested in a specific and targeted anatomy region. Although turning on the x-ray source on its lower trajectory limits radiation exposure of both the patient and the physician, it still exposes more of the patient to x-rays than is desirable and does not fully shield the physician from exposure. Exposure to x-ray radiation could be reduced through the use of an x-ray source limited in fan-angle coverage to the region of interest (ROI) of the patient. The data resulting from the limited X-ray source would then be limited in terms of fan-angle coverage. However, no previously known method or apparatus provides reconstruction, from such limited data, with the image quality typical of a state-of-the art CT scanner. When direct reconstruction is attempted from such limited data, a very large object-dependent shading is introduced over the ROI, rendering the image data useless.

It would therefore be desirable to provide a reconstruction method and apparatus that provided image reconstruction from limited projection data obtained from a CT scanner. In particular, it would be desirable to obtain such high-quality reconstruction of a region of interest from data obtained from a beam of limited fan-angle extent, or from limited exposure to a wider, collimated beam. In addition, because the ROI may not be directly centered in a beam from an X-ray source of a CT scanner, it would be desirable to provide a method and apparatus for transposing the ROI into the center of the beam without shifting the patient relative to the scanner bed.

BRIEF SUMMARY OF THE INVENTION

In one embodiment, the present invention is thus a method for reconstructing an image of an object utilizing an imaging system, in which a limited width beam of radiation is emitted towards the object, the limited width beam of radiation having a fan beam angle extent selected to encompass a perimeter of a region of interest (ROI) within the object and to encompass less than a perimeter of the object itself; a set of truncated projection data of the object, including projection data of the ROI, is obtained by detecting the radiation from the limited width beam of radiation passing through the object; low frequency components of the set of truncated projection data are estimated; and an image of the ROI within the object is reconstructed utilizing the set of truncated projection data and the estimated low frequency components. In this embodiment, high frequency components of the projection over the ROI are directly measured. A corresponding apparatus embodiment in accordance with the invention is also disclosed herein.

Information from a limited set of complete projection data can be used to estimate the low frequency components of the set of truncated projection data. However, additional information from complete projections is not required for reconstructing the image of the ROI, because low frequency components can also be estimated directly from the set of truncated projection data. Because the estimated low frequency components together with the set of truncated projection data are sufficient to reconstruct a high quality image, there is no need to obtain a full set of complete projection data with a broad beam of radiation, whether or not a partial set of complete projection data is utilized to obtain the low frequency component estimates.

The above described methods and apparatus achieve high quality image reconstruction from partial, or truncated projection data, thereby providing a reduced exposure to X-ray radiation for a patient and for medical personnel attending to the patient.

DETAILED DESCRIPTION OF THE INVENTION

Figure 1:
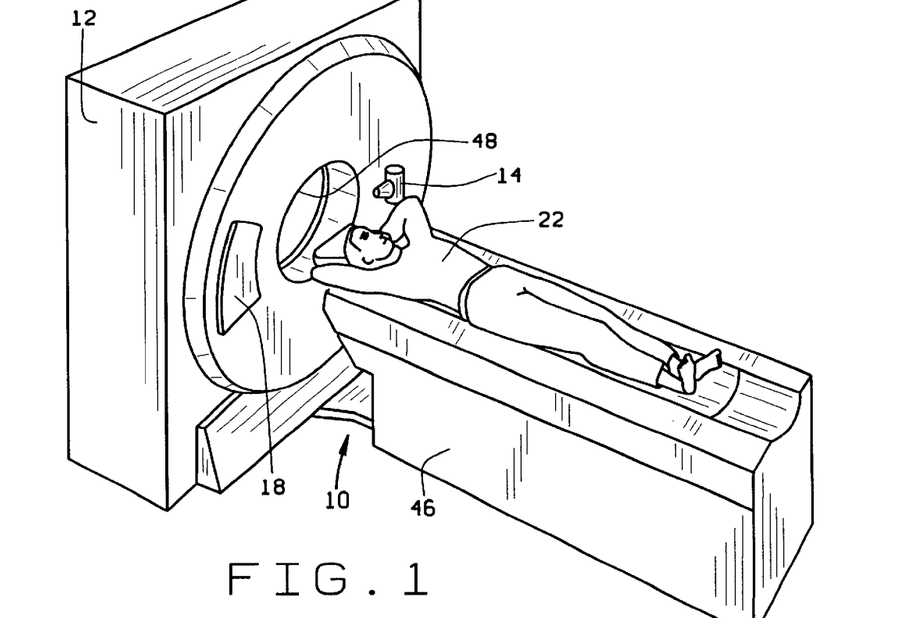
FIG. 1 is a pictorial view of a CT imaging system.
Figure 2:
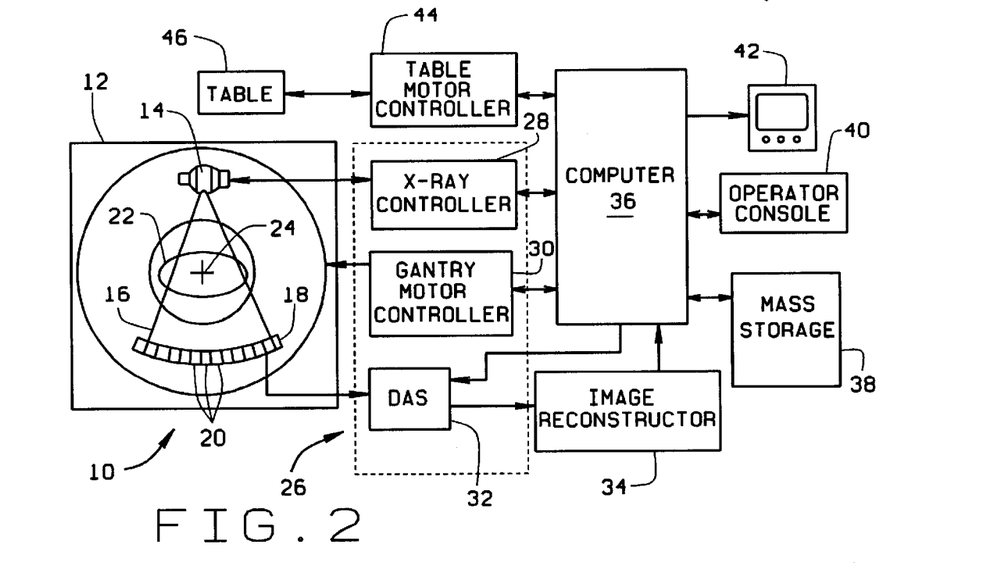
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
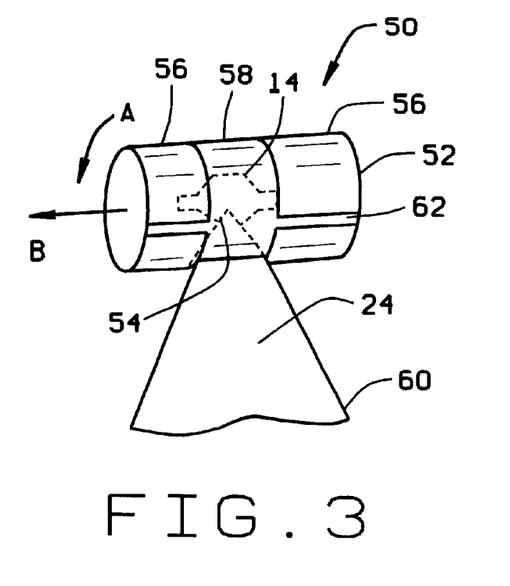
FIG. 3 is a drawing of a view of a modified, low dose x-ray source useful in practicing the invention in conjunction with the CT imaging system of FIGS. 1 and 2.

FIG. 3 is a drawing of a low dose x-ray assembly 50 modified for use in one embodiment of the invention in conjunction with CT imaging system 10. A rotating cylinder or sleeve 52 of a material relatively transparent to x-rays, for example, aluminum, covers an outer part of an x-ray beam collimator 54 of x-ray source 14. X-ray source 14 is inside sleeve 52 and is therefore shown in phantom. Sleeve 52 is covered or coated, in part, by partial rings 56 of a material that is relatively opaque to x-rays, such as lead. In one embodiment, partial rings 56 are coated on an inside or outside surface of sleeve 52. A gap 58 between partial rings 56 permits a limited width x-ray beam 60, i.e., a beam having limited fan beam angle extent, to emerge from sleeve 52. As gantry 12 rotates, sleeve 52 rotates around an axis of rotation B in a direction shown by arrow A. As sleeve 52 rotates, a slit 62 in partial rings 56 rotates in front of x-ray source 14. As a result, x-ray beam 60 widens to fully cover the extent of the object or patient 22 (not shown in FIG. 3) for a fraction of the scan time. The widened, broad beam results in the collection of a few complete projections of a sinogram. X-ray dosage is limited, as x-rays are emitted in "side" areas of the fan-beam 60 for only a fraction of the total number of projections. Low and high frequency components of the data collected using x-ray assembly 50 are directly measured. In another embodiment, partial rings 56 are telescopically slidable over sleeve 52 to permit adjustment of the width of the limited width x-ray beam 60 and to permit adjustment of its direction. In this manner, limited width x-ray beam 60 emerging from gap 58 can be narrowly directed towards a selected region of interest that is not necessarily at isocenter 24.

In one embodiment, low frequency components are estimated from a partial set of complete projection data obtained when slit 62 rotates into the path of a broad x-ray beam emerging from collimator 54. A few complete projections suffice for high quality reconstruction, because the low-frequency components of the projection vary relatively slowly with projection angle, and can therefore be estimated, such as by interpolation, from a few complete projections. In one embodiment, a stored program to perform the interpolation resides in mass storage 38, with computer 36 executing instructions from the stored program. Satisfactory results are obtained when only a fraction of the projections are complete. High quality images are obtained when only 10% of a number of projections sufficient for reconstruction of an image are complete projections. Much improved results, as compared to no correction, are obtained when only 1% of the projections obtained are complete projections, or even when only 1 to 4 complete projections are obtained per rotation. It should be noted that projections from a complete 360° rotation are not required for image reconstruction. It is sufficient to obtain projections from a rotation of 180° plus a fan beam extent width of the widest projection to reconstruct image data.

Figure 4:
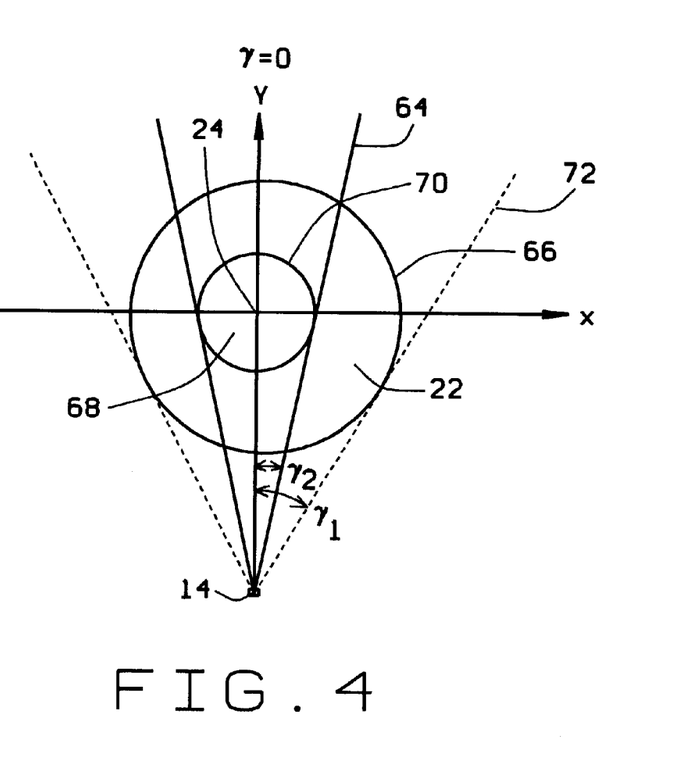
FIG. 4 is a schematic representation of a CT imaging system providing limited data acquisition within a limited width beam of radiation, i.e., a beam having a reduced fan beam angle extent.

FIG. 4 is a schematic representation of an embodiment of a CT imaging system 10 in which a reduction in x-ray dosage to a patient 22 is achieved through the use of limited width x-ray beam 64, i.e., a beam having a reduced or truncated fan beam angle extent $\gamma_2$, to obtain projection data. In addition, radiation exposure to physicians and other personnel working in the vicinity of patient 22 is reduced. Truncated projection data that is obtained in this embodiment is used to reconstruct an image of a region of interest. In FIG. 4, an object 22, such as a patient, has an extent delimited by an outer perimeter 66. Within object 22 is a region of interest (ROI) 68 that is contained within an inner perimeter 70. Radiation from x-ray source 14 is directed towards object 22 and ROI 68. A first, partial set of complete projection data of object 22, including ROI 68, is obtained from radiation of a broad x-ray beam 72 having a first fan beam angle extent $\gamma_1$ encompassing a perimeter of object 22. A second set of truncated projection data is obtained of ROI 68 from radiation from a limited width x-ray beam 64 encompassing a perimeter 70 of ROI 68. X-ray beams 72 and 64 are projected from a single source 14 having an adjustable pre-patient collimator such as rotating sleeve or cylinder 52 in FIG. 3. High and low frequency components are directly measured for the first set of projection data. High frequency components over ROI 68 are directly measured for the second set of projection data. Low frequency components over ROI 68 for the second set of projection data are estimated from the measured low frequency components of the first set of projection data. Limited width x-ray beam 64 need only be wide enough to encompass perimeter 70 of ROI 68 and not so wide as to encompass a perimeter of object 22, thus exposing a smaller portion of object 22 to less radiation than would otherwise be necessary for imaging. In addition, scattered and direct radiation to which medical personnel might otherwise be exposed is also reduced.

In another embodiment, low frequency components of a set of partial or truncated projection data over ROI 68 are directly estimated. In this embodiment, no broad x-ray beam 72 is used, thus further reducing x-ray exposure to patient 22. To provide corrected data, a circular uniform object is defined for each projection. The two parameters $\mu$, an attenuation of the circular, uniform object, and R, a radius of the object, are estimated from the projection data at center (ray $\gamma=0$) and at an edge or perimeter 70 of ROI 68. Radius R is constrained to be greater than the radius of ROI 68. Fitting may be achieved in a number of ways, for example, by a least square method. The profile of the hypothetical, uniform object is then subtracted from the projection data in the available data range. As the data outside the available range is forced to zero, the assumption is made that the true object position matches the uniform projection outside ROI 68. Correction for the procedure is made, after back projection, by adding to each pixel in the reconstructed image the value $$\left(\frac{1}{N}\right) \times \sum_{i=1}^{n} \mu_i,$$

where N is the number of projections and $\mu_i$ is the attenuation of the uniform, circular object defined for projection i.

The estimate for the low frequency component of the projection is refined in one or more ways. In one embodiment, an estimate of the object DC component is calculated from a summation of the central ray value (i.e., at $\gamma=0$) over the projection index i. This estimate differs from the true object DC because the corresponding polar coordinate integration is carried over without the Jacobian factor r. However, the corresponding discrepancy is calculable for a uniform, circular object. In another embodiment, information gathered from a missing part of the projection from projections at about 90° angle (i.e., a horizontal rather than the vertical orientation of x-ray beam 16 shown in FIG. 2) is used to refine the model. In another embodiment, sinogram information is processed to improve projection estimates, and iterative methods relying upon reprojection of reconstructed, intermediate images are also be used to improve local reconstruction of projection data. The use of calibration phantoms and scaling of the scanned object error as a function of the integral of the data from available projections is also useful to correct artifacts.

More particularly, two parameters to be estimated for each projection i are ($\hat{R}_i, \hat{\mu}_i$). Let $i_L$ and $i_H$ be the indices for the two extreme rays available in the ROI, and $p(i_L), p(i_H)$ be the associated projection values.

Let Jump=(½){p($i_L$)+p($i_H$)} and p($i_C$)=the projection value for the ray at center, i.e., at ray index $i_C$.

If, indeed, the available data correspond to the projection of a circular uniform object, then:

$$\text{Jump} = 2\mu_i \sqrt{R^2_i - R(ROI)^2}$$

and $$p(i_C) = 2\mu_i R_i,$$

where R(ROI) is the radius of ROI 68.

At this point, it is assumed that ROI 68 is circular and centered on isocenter 24, although the following results can be generalized by one skilled in the art for other cases. From the above, it follows that:

$$\hat{\mu}_i^o = \frac{\sqrt{|p^2(i_c) - \text{Jump}^2|}}{2R(ROI)}, \quad \text{and} \quad \hat{R}_i = \frac{p(i_c)}{2\hat{\mu}_i^o}.$$

If $\hat{R}_i<(ROI)$, then $\hat{R}_i$ is set to R(ROI). Then, from the given radius, a final estimate of the attenuation, $\mu_i$, is determined by:

$$\hat{\mu}_i \sum_{j=i_L}^{i_h} 2\sqrt{\hat{R}_i^2 - t_j^2} = \sum_{j=i_L}^{i_h} p(j)$$

where $t_j=S \sin(\gamma_j)$, $\gamma_j$ is an angle between a central ray of the beam and the beam indexed by j, and S is a distance from the source of the beam to the iso-center, i.e., an axis of rotation of gantry 12 in FIGS. 1 and 2. It will be recognized that the above estimates can be supplemented by estimates of low frequency projection components obtained from nontruncated, i.e., complete projections. For example, parameters $\hat{R}_i$ and $\hat{\mu}_i$ obtained by fitting truncated projections can be further fitted to estimates of low frequency components obtained from nontruncated projections.

Figure 5:
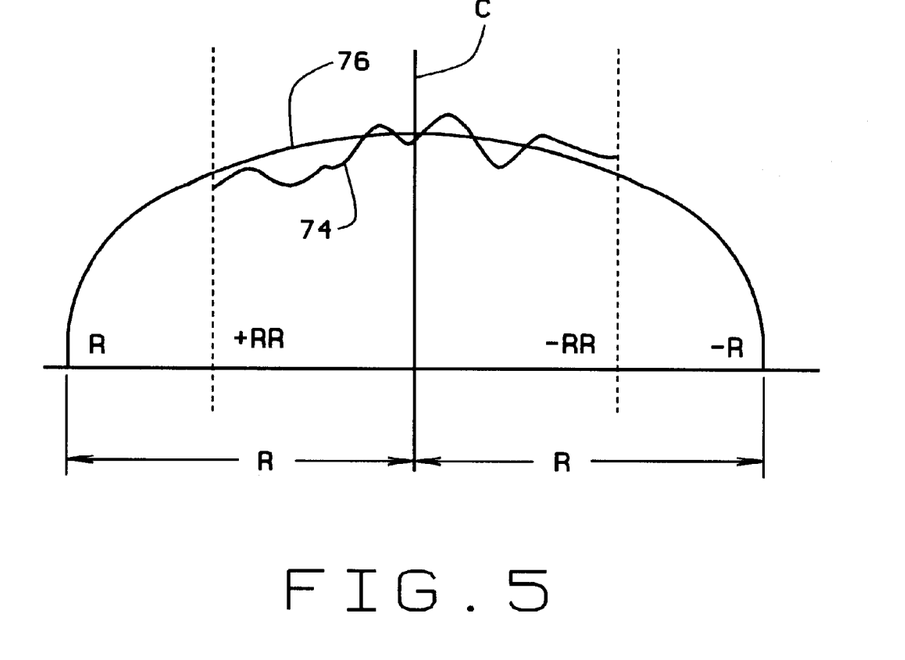
FIG. 5 is a schematic representation of truncated projection data fitted with the projection of a circular, uniform object.

FIG. 5 is a schematic representation of truncated projection data fitted with a projection of a circular uniform object. A center of fitted data 74 from ROI 68 is represented by axis C. Curve 76 represents data from the hypothesized circular uniform object. In one embodiment, the truncated projection data is fitted with the projection of the circular, uniform object so that the integral of the projection over the range of available data over an interval [−RR, +RR] (representing the extent of the region of interest) matches the integral of the uniform circular object over the same range. (A range [−R, +R] represents the extent of the circular, uniform object, which may or may not be the same as the radius of object 22, but must be greater than the radius of ROI 68.) The fitted object projection is then subtracted from the available limited data over the range of available data [−RR, +RR]. The reconstructed data 74 is obtained by adding a constant $$\left(\frac{1}{N}\right) \times \sum_{i=1}^{n} \mu_i$$

to each pixel.

In another embodiment, as an alternative to modified collimator 50 shown in FIG. 3, x-ray source 14 is provided with more than one collimator setting to provide more than one fan beam angle extent. X-ray source 14 is controlled by x-ray controller 28. A stored program providing instructions for implementing the reconstruction method is provided in a portion of mass storage 38, with the instructions being executed by computer 36. It will be recognized that, as an alternative, more than one x-ray source 14 with different fan beam angle extents may be used to provide x-ray beams of different fan beam angle extents.

Figure 6:
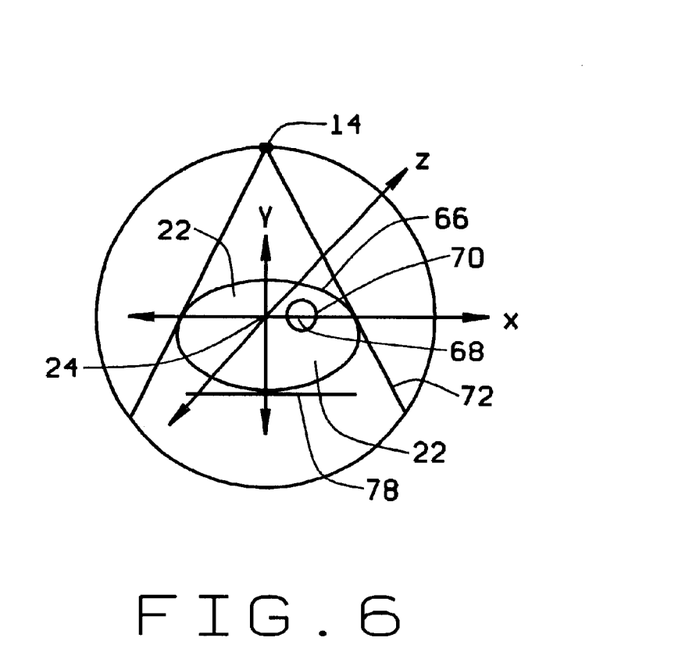
FIG. 6 is a schematic representation of a conventional CT scan field of view.

An assumption expressly made for the equations derived above was that the ROI of the object was in the central portion of an x-ray beam. Generalizations of the equations can be derived to handle cases in which ROI 68 is not in a central region of the beam. However, in one embodiment, ROI 68 is directly positioned into the central region by offsetting beam 72 from a center of rotation 24 of gantry 12, as shown by schematic representation in FIG. 6. If ROI 68 represents a small organ, it can readily be seen that imaging the small organ exposes the whole cross-section of a patient, here represented by object 22.

Figure 7:
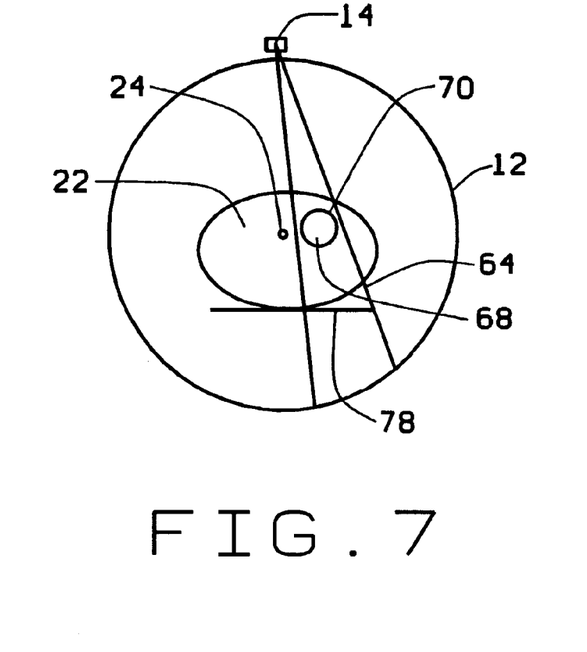
FIG. 7 is a schematic representation of a limited width x-ray beam projected at an off-axis region of interest.
Figure 8:
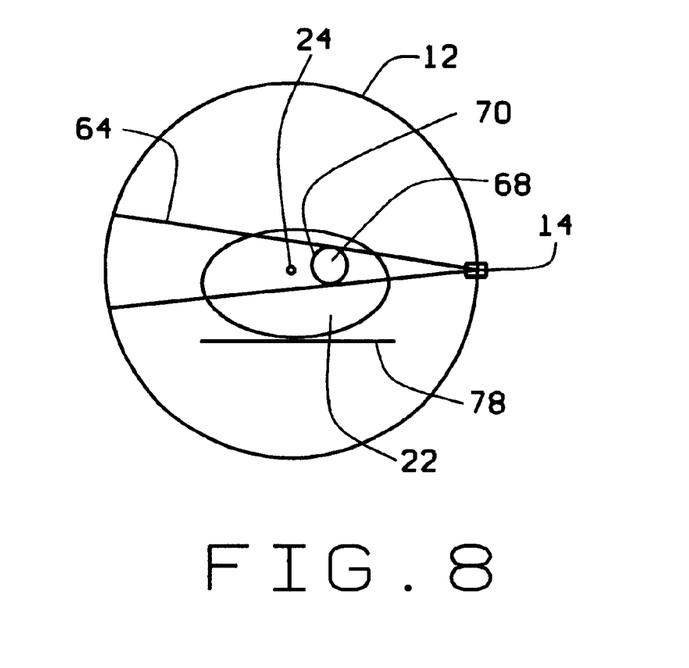
FIG. 8 is another schematic representation of the limited width x-ray beam of FIG. 7 projected at the off-axis region of interest from a different projection angle.

FIG. 7 is a schematic representation of a limited width x-ray beam 64 projected at off-axis ROI 68. FIG. 8 is another schematic representation showing limited width beam 64 projected at ROI 68 from a different source angle. Although it is clear from these representations that a collimated beam provides less x-ray exposure for a patient, a different portion of detector array 18 (shown in FIG. 2) would have to be used to collect projection data at different projections.

Figure 9:
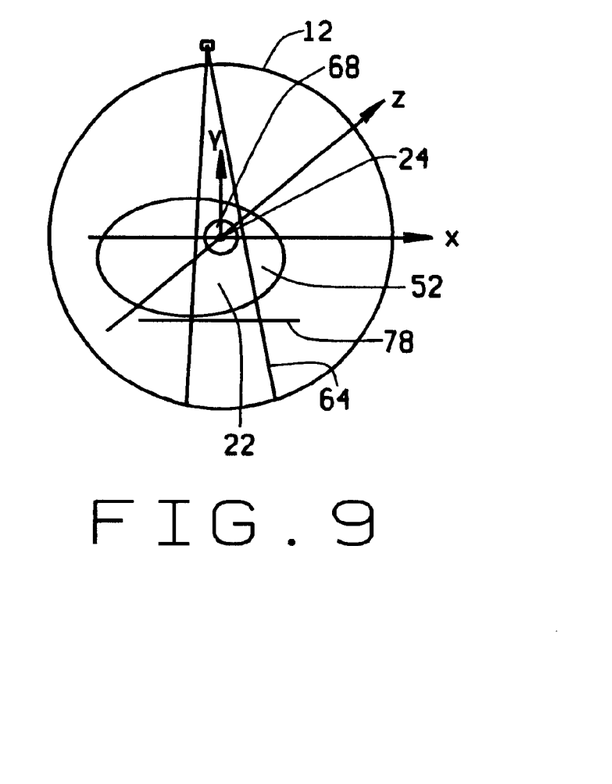
FIG. 9 is a schematic representation of a CT scanner projecting a narrow, collimated x-ray beam at a ROI that has been brought into the center of the beam with a horizontally repositionable patient table.
Figure 10:
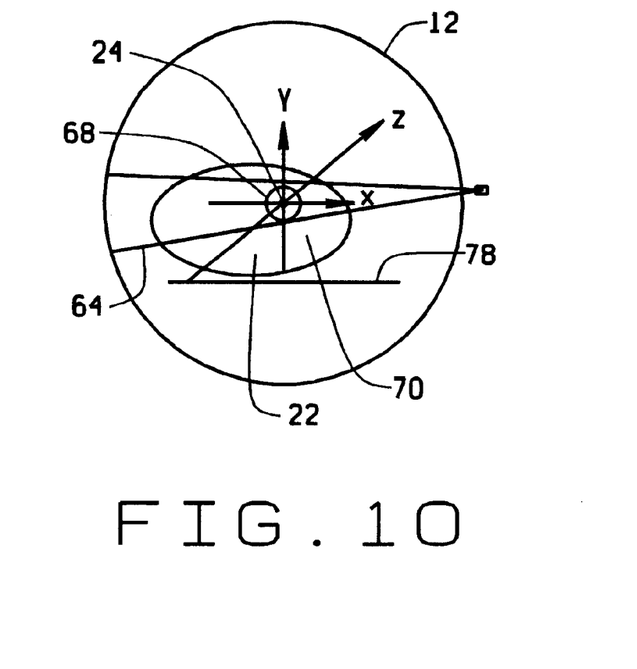
FIG. 10 is another schematic representation of the CT scanner of FIG. 9 in which the limited width x-ray beam is projected at the ROI from a different projection angle.

Therefore, in one embodiment, positioning is accomplished with scout imaging, allowing use of a smaller detector and a simpler collimator design, and also reducing data acquisition requirements to image an organ within body 22. Table 46, which supports patient 22 in FIGS. 1 and 2 and which is shown in FIGS. 9 and 10 as a surface 78 supporting object 22, is made moveable along two different axes defining a plane intersecting an axis of rotation of gantry 12 at a point. Table 46 is also moveable along the axis of rotation of gantry 12. In one embodiment, the two different axes are a y- and an x-axis, and the axis of rotation of the gantry is a z-axis. The x-, y-, and z-axes are all mutually perpendicular to one another. Horizontal x-axis positioning provides extra flexibility that is not possible with currently known table positioning motions in the vertical y-axis direction, and the z-axes motion used for helical scanning. The additional left and right horizontal positioning permits an organ of interest 68 to be positioned near center 24 of the scan field of view. When a limited width beam 64 is used, x-ray exposure is limited to organ of interest 68 with minimum exposure to areas outside organ 68. Furthermore, only a central portion of detector array 18 (shown in FIG. 2) is used and the area and/or cost of a large detector array 18 and complex acquisition hardware may be avoided, or complex calculations in generalizing reconstruction equations may be avoided. Tables 46 having such expanded positioning capabilities can also be used in embodiments with flat-panel detector CT systems.

For image reconstruction with truncated projection data, it has been shown that anatomic information can be preserved in a region of interest with iterative reconstruction. Care in the selection of initial conditions may be used to preserve more accurate CT number distribution in the region of interest. Various images are presented as comparative examples in FIGS. 11 through 14.

Figure 11:
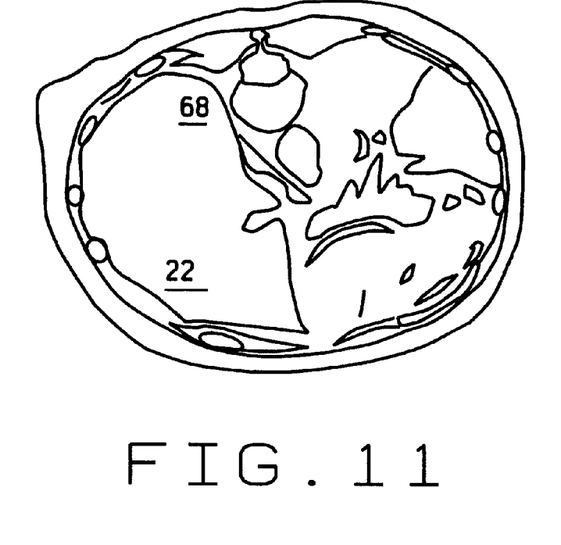
FIG. 11 is a drawing of a full field of view reconstruction of patient data including a region of interest (w,l)=(200,30).

FIGS. 11, 12, 13, and 14 are drawings of reconstructed patient data. FIG. 11 is a drawing of a full field of view reconstruction patient data, with window width and level (w,l)=(200,30). Patient 22 was exposed to a full dose of x-ray exposure to obtain data for FIG. 11. A region of interest 68 is noted inside patient 22.

Figure 12:
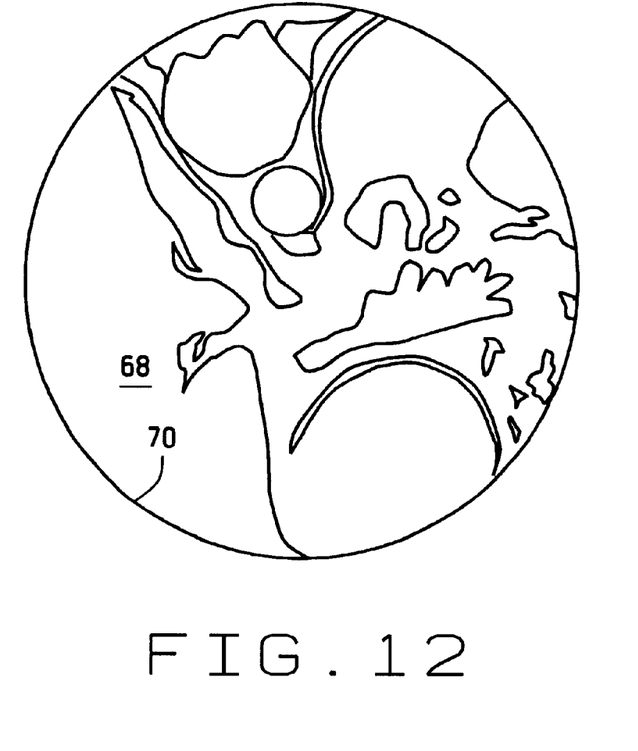
FIG. 12 is a drawing of a direct incomplete data reconstruction of the region of interest of FIG. 11 (w,l)=(200,30).

FIG. 12 is a drawing of a direct incomplete data reconstruction of region of interest 68 shown in FIG. 11, with (w,l)=(200,30). Region of interest 68 lies within a circular region delimited by perimeter 70. No fitting was performed, so as expected, the reconstructed image is of poor quality.

Figure 13:
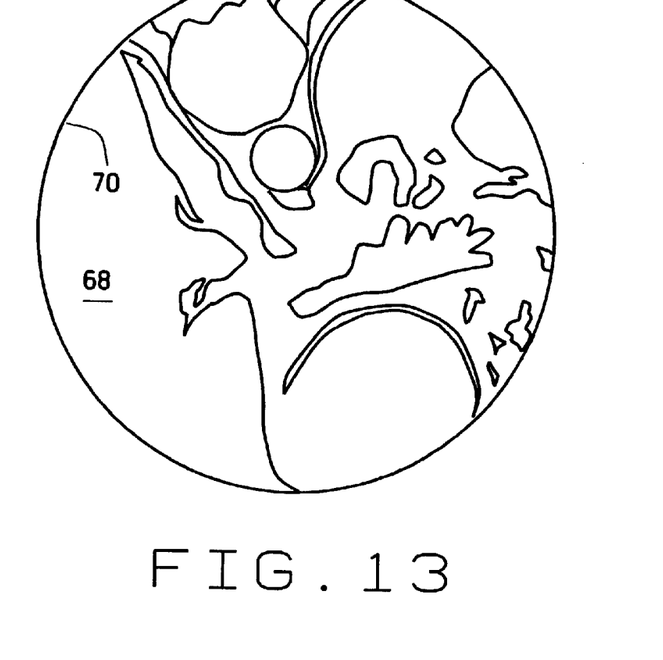
FIG. 13 is a drawing of a local reconstruction, in accordance with an embodiment of the invention, of the region of interest of FIG. 15 (w,l)=(200,30).

FIG. 13 is a drawing of a local reconstruction, in accordance with an embodiment of the invention, of region of interest 68, with (w,l)=(200,30). The image shown in FIG. 13 is derived from projections all taken with beams having reduced fan beam angle extent, and with fitted data. It will be observed that the image quality is much superior to that of FIG. 12.

Figure 14:
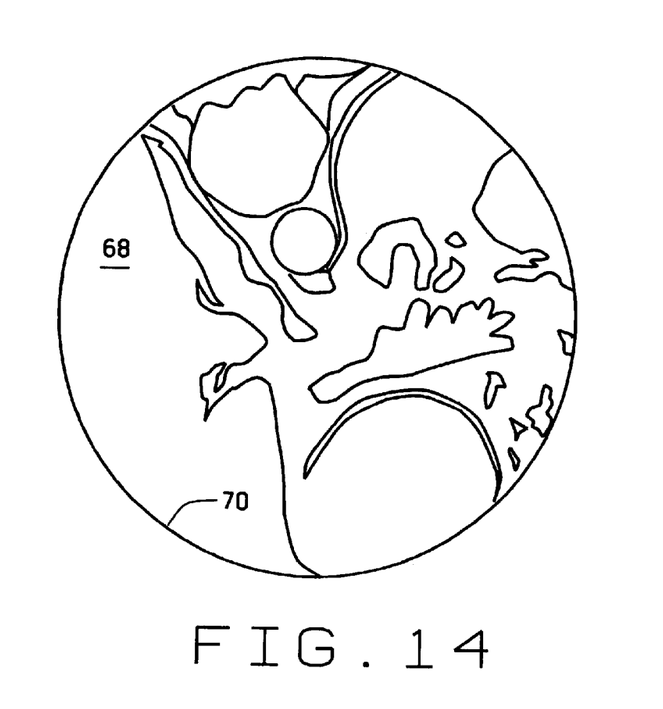
FIG. 14 is a drawing of a "low-dose" local reconstruction of the region of interest of FIG. 11, with 1% complete projections, in accordance with an embodiment of the invention (w,l)=(200,30).

FIG. 14 is a drawing of a local reconstruction, in accordance with an embodiment of the invention, of region of interest 68, with (w,l)=(200,30). "Low dose" data was employed, i.e., data obtained from one fan beam angle extent with only a portion of projections complete. In FIG. 14, the portion of complete projections is 1%. Despite the incompleteness of the projection data, an image comparable in quality to that of FIG. 11 was obtained.

The above described methods provide improved reconstruction of CT image data while reducing the exposure of a patient and attending medical personnel to X-ray radiation. Where a uniform object fitting model is used with narrow fan-beam angle extent data, it is possible to greatly reduce shading in reconstructed images using limited projection data. A table having horizontal positioning capability simplifies placement of a region of interest within a narrow beam. Although the methods described herein are relatively simple, these methods greatly enhance the quality of limited data reconstructions, including those in which all projections are truncated.

Although various embodiments of the invention have been described and illustrated in detail, it is to be clearly understood that the same is intended by way of illustration and example only and is not to be taken by way of limitation. In addition, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used if individual detector elements are corrected to provide substantially uniform responses to a given x-ray beam. Moreover, the system described herein performs an axial scan, however, the invention may be used with a helical scan although more than 360° of data are required. Accordingly, the spirit and scope of the invention are to be limited only by the terms of the appended claims.

What is claimed is:

1. A method for reconstructing an image of an object utilizing an imaging system, said method comprising:

emitting a limited width beam of radiation towards the object, the limited width beam of radiation having a fan beam angle extent selected to encompass a perimeter of a region of interest (ROI) within the object and to encompass less than a perimeter of the object itself;

obtaining a set of truncated projection data of the object, including projection data of the ROI, by detecting the radiation from the limited width beam of radiation passing through the object;

estimating low frequency components of the set of truncated projection data; and reconstructing an image of the ROI within the object utilizing the set of truncated projection data and the estimated low frequency components.

2. A method in accordance with claim 1 wherein the limited width beam of radiation is a limited width x-ray beam, and emitting a limited width beam of radiation towards the object comprises the step of emitting an x-ray beam towards the object.

3. A method in accordance with claim 2 further comprising the steps of emitting a broad x-ray beam having a fan beam angle extent greater than that of the limited width x-ray beam towards the object and obtaining at least one complete projection of the object by detecting radiation from the broad x-ray beam; and wherein estimating low frequency components of the set of truncated projection data comprises the step of estimating low frequency components of the set of truncated projection data utilizing the at least one complete projection of the object.

4. A method in accordance with claim 3 wherein the imaging system is a scanning imaging system, the limited width x-ray beam and the broad x-ray beam are emitted by an x-ray source mounted on a rotating gantry of the scanning imaging system, and wherein no more than 10% of a total of truncated projections and complete projections sufficient for reconstruction of the image are complete projections.

5. A method in accordance with claim 4 wherein no more than 1% of the total of truncated projections and complete projections sufficient for reconstruction of the image are complete projections.

6. A method in accordance with claim 4 wherein no more than four projections are complete projections.

7. A method in accordance with claim 3 wherein the imaging system is a scanning imaging system, the broad and the limited width x-ray beam are emitted by an x-ray source mounted on a rotating gantry of the scanning imaging system, and further comprising the step of rotating a masking sleeve around the x-ray source to selectively generate the broad x-ray beam and the limited width x-ray beam.

8. A method in accordance with claim 7 further comprising the step of adjusting the masking sleeve to select an emission direction of the limited width x-ray beam to encompass the perimeter of the ROI.

9. A method in accordance with claim 8 wherein the rotating gantry has an axis of rotation, said method further comprising the steps of supporting the object on a table repositionable along at least two different axes defining a plane intersecting the axis of rotation of the gantry at a point, and moving the table to position the ROI within the limited width x-ray beam.

10. A method in accordance with claim 8 wherein the rotating gantry has an axis of rotation, said method further comprising the steps of supporting the object on a table and moving the table in a horizontal direction perpendicular to the axis of rotation of the gantry to position the perimeter of the ROI within the limited width x-ray beam.

11. A method in accordance with claim 3 wherein estimating a low frequency component includes estimating a DC component.

12. A method in accordance with claim 2 wherein the imaging system is a scanning imaging system, the limited width x-ray beam is emitted by an x-ray source mounted on a rotating gantry of the scanning imaging system, the rotating gantry has an axis of rotation, said method further comprising the steps of supporting the object on a table repositionable along at least two different axes defining a plane intersecting the axis of rotation of the gantry at a point, and moving the table to position the ROI within the limited width x-ray beam.

13. A method in accordance with claim 2 wherein the imaging system is a scanning imaging system, the limited width x-ray beam is emitted by an x-ray source mounted on a rotating gantry of the scanning imaging system, the rotating gantry has an axis of rotation, said method further comprising the steps of supporting the object on a table and moving the table in a horizontal direction perpendicular to the axis of rotation of the gantry to position the ROI within the limited width x-ray beam.

14. A method in accordance with claim 1 wherein estimating low frequency components of the set of truncated projection data comprises the step of fitting values of R and $\mu_i$ to a uniform circular object defined for each projection of the set of truncated projection data, where R is a radius of the uniform circular object and $\mu_i$ is an attenuation of the uniform circular object for each truncated projection i, and R is greater than a radius of the ROI.

15. A method in accordance with claim 14 wherein reconstructing an image of the ROI comprises the steps of subtracting a profile of the fitted circular uniform object from the set of truncated projection data to generate pixel data and adding to the pixel data thereby generated the value $$\left(\frac{1}{N}\right) \times \sum_{i=1}^{N} \mu_i$$

to generate pixels of the image of the ROI, where N is the number of truncated projections.

16. A method in accordance with claim 15 wherein the ROI has a center and a perimeter, and fitting values of R and $\mu_i$ comprises the step of estimating R and $\mu_i$ from projection data obtained at the center and at the perimeter of the ROI.

17. A method in accordance with claim 16 wherein the limited beam width radiation is a limited width x-ray beam, and obtaining a set of truncated projection data comprises the step of masking an x-ray source to obtain the limited width x-ray beam.

18. A method in accordance with claim 17 wherein the limited width x-ray beam has a central portion, the set of truncated projection data comprises projection components from the central portion of the limited fan beam angle extent x-ray beam, and estimating a low frequency component of the set of truncated projection data comprises the step of analyzing a summation of projection components from the central portion of the limited width x-ray beam over a plurality of truncated projections from the set of truncated projections.

19. A method in accordance with claim 14 wherein the limited width beam of radiation is a limited width x-ray beam, and emitting a limited width beam of radiation towards the object comprises the step of emitting an x-ray beam towards the object;

said method further comprising the steps of emitting a broad x-ray beam having a fan beam angle extent greater than that of the limited width x-ray beam towards the object; and obtaining at least one complete projection of the object by detecting radiation from the broad x-ray beam;

and wherein said step of estimating low frequency components of the set of truncated projection data utilizes the at least one complete projection of the object to estimate the low frequency components.

20. A imaging system for reconstructing an image of an object, said system configured to:
   emit a limited width beam of radiation towards the object, the limited width beam of radiation having a fan beam angle extent selected to encompass a perimeter of a region of interest (ROI) within the object and to encompass less than a perimeter of the object itself;
   obtain a set of truncated projection data of the object, including projection data of the ROI, by detecting the radiation from the limited width beam of radiation passing through the object;
   estimate low frequency components of the set of truncated projection data; and
   reconstruct an image of the ROI within the object utilizing the set of truncated projection data and the estimated low frequency components.

21. A system in accordance with claim 20 wherein said limited width beam of radiation is a limited width x-ray beam, and said limited width beam of radiation emitted towards the object is said limited width x-ray beam.

22. A system in accordance with claim 21 further configured to emit a broad x-ray beam having a fan beam angle extent greater than that of said limited width x-ray beam towards the object and to obtain at least one complete projection of the object by detecting radiation from said broad x-ray beam; and said system is configured to estimate low frequency components of said set of truncated projection data utilizing said at least one complete projection of the object.

23. A system in accordance with claim 22 further comprising:
   a rotating gantry; and
   an x-ray source mounted on said rotating gantry;
   said system configured to scan the object with said x-ray source to obtain said truncated projection data and said at least one complete projection, said x-ray source selectively emitting said limited width x-ray beam and said broad x-ray beam, and said system configured so that no more than 10% of a total of said truncated projections and said complete projections sufficient for reconstruction of the image are complete projections.

24. A system in accordance with claim 23 configured so that no more than 1% of the total of said truncated projections and said complete projections sufficient for reconstruction of the image are complete projections.

25. A system in accordance with claim 23 configured to reconstruct the image of the object utilizing no more than four complete projections.

26. A system in accordance with claim 22 further comprising:
   a rotating gantry;
   an x-ray source mounted on said rotating gantry, said system configured to scan the object with said x-ray source to obtain said truncated projection data and said at least one complete projection; and
   a masking sleeve around said x-ray source, said masking sleeve configured to selectively mask said x-ray source so that said x-ray source selectively emits said limited width x-ray beam and said broad x-ray beam.

27. A system in accordance with claim 26 wherein said masking sleeve is adjustable to select an emission direction of the limited width x-ray beam.

28. A system in accordance with claim 27 wherein said rotating gantry has an axis of rotation, said system further comprises a table configured to support the object, and wherein said table is repositionable along at least two different axes defining a plane intersecting the axis of rotation of the gantry at a point to position the ROI within said limited width x-ray beam.

29. A system in accordance with claim 27 wherein said rotating gantry has an axis of rotation, said system further comprises a table configured to support the object, and wherein said table is repositionable in a horizontal direction perpendicular to said axis of rotation of the gantry to position the perimeter of the ROI within said limited width x-ray beam.

30. A system in accordance with claim 22 further configured to estimate a DC component of said set of truncated projection data.

31. A system in accordance with claim 21 further comprising:
   a rotating gantry having an axis of rotation;
   an x-ray source mounted on said rotating gantry, said system configured to scan the object with said x-ray source to obtain said truncated projection data; and
   a table configured to support the object, wherein said table is repositionable along at least two different axes defining a plane intersecting said axis of rotation of the gantry at a point to position the ROI within said limited width x-ray beam.

32. A system in accordance with claim 21 further comprising:
   a rotating gantry having an axis of rotation;
   an x-ray source mounted on said rotating gantry, said system configured to scan the object with said x-ray source to obtain said truncated projection data; and
   a table configured to support the object, wherein said table is repositionable along a horizontal direction perpendicular to said axis of rotation of the gantry to position the ROI within said limited width x-ray beam.

33. A system in accordance with claim 20 wherein said system is further configured to fit values of R and $\mu_i$ to a uniform circular object defined for each projection of the set of truncated projection data for estimating said low frequency components of the set of truncated projection data, where R is a radius of the uniform circular object and $\mu_i$ is an attenuation of the uniform circular object for each truncated projection i, and R is greater than a radius of the ROI.

34. A system in accordance with claim 33 wherein said system is configured to subtract a profile of the fitted circular uniform object from the set of truncated projection data to generate pixel data and to add to the pixel data thereby generated the value $$\left(\frac{1}{N}\right) \times \sum_{i=1}^{N} \mu_i$$

to generate pixels of the image of the ROI for reconstruction of an image of the ROI.

35. A system in accordance with claim 34 wherein the ROI has a center and a perimeter, and said system is configured to estimate R and $\mu_i$ from projection data obtained at the center and at the perimeter of the ROI for fitting values of R and $\mu_i$.

36. A system in accordance with claim 35 wherein said limited beam width radiation is a limited width x-ray beam, and said system is configured to mask an x-ray source to obtain said limited width x-ray beam for obtaining a set of truncated projection data.

37. A system in accordance with claim 36 wherein said limited width x-ray beam has a central portion, the set of truncated projection data comprises projection components from the central portion of said limited fan beam angle extent x-ray beam, and said system is configured to analyze a summation of projection components from the central portion of the limited width x-ray beam over a plurality of truncated projections from the set of truncated projections for estimating a low frequency component of the set of truncated projection data.

38. A system in accordance with claim 33 wherein the limited width beam of radiation is a limited width x-ray beam, and said limited width beam of radiation emitted towards the object is said limited width x-ray beam;

said system further configured to emit a broad x-ray beam having a fan beam angle extent greater than that of said limited width x-ray beam towards the object; to obtain at least one complete projection of the object by detecting radiation from said broad x-ray beam; and to utilizes said at least one complete projection of the object to estimate said low frequency components.

* * * * *